(12) United States Patent
Wang et al.

(10) Patent No.: US 8,277,772 B2
(45) Date of Patent: Oct. 2, 2012

(54) METHOD OF EXTRACTING TE AND BISMUTH OXIDE AND RECOVERING BYPRODUCTS

(75) Inventors: Jun Wang, Chengdu (CN); Xiuzhen Wang, Chengdu (CN); Zexian Song, Chengdu (CN)

(73) Assignee: Jun Wang, Chengdu (CN)

( * ) Notice: Subject to any disclaimer, the term of this patent is extended or adjusted under 35 U.S.C. 154(b) by 112 days.

(21) Appl. No.: 12/995,185

(22) PCT Filed: Jun. 2, 2009

(86) PCT No.: PCT/CN2009/072096
§ 371 (c)(1),
(2), (4) Date: Dec. 2, 2010

(87) PCT Pub. No.: WO2009/146647
PCT Pub. Date: Dec. 10, 2009

(65) Prior Publication Data
US 2011/0076208 A1    Mar. 31, 2011

(30) Foreign Application Priority Data
Jun. 2, 2008  (CN) .......................... 2008 1 0044496

(51) Int. Cl.
*C01B 19/02* (2006.01)
*C01B 19/00* (2006.01)
*B01D 11/00* (2006.01)

(52) U.S. Cl. ............. 423/510; 423/508; 423/20; 423/27
(58) Field of Classification Search ........................ None
See application file for complete search history.

(56) References Cited

U.S. PATENT DOCUMENTS
5,271,909 A    12/1993   Claessens et al.
5,939,042 A    8/1999    Stafiej et al.

FOREIGN PATENT DOCUMENTS
| | | |
|---|---|---|
| CN | 1109021 A | 9/1995 |
| CN | 93115389 | 9/1995 |
| CN | 99111440 | 2/2000 |
| CN | 101029353 A | 9/2007 |
| CN | 1821060 A | 8/2008 |
| CN | 101289171 A | 10/2008 |
| JP | 62-007609 A | 1/1987 |
| SU | 214811 A | 12/1977 |
| SU | 1313479 A | 5/1987 |

*Primary Examiner* — Melvin C Mayes
*Assistant Examiner* — Sheng H Davis
(74) *Attorney, Agent, or Firm* — Michael Fedrick; Loza & Loza, LLP

(57) ABSTRACT

A method of extracting Te and bismuth oxide and recovering byproduct comprises: leaching raw materials with a Te content of $\geq 1.8\%$ by utilizing a leaching system containing $H_2SO_4$, $Cl^-$, $Br^-$, $NH_4^+$ and $NaClO_3$, reducing leach solution with $SO_2$ gas by precipitation method after separating impurities from it, washing with concentrated hydrochloric acid to obtain tellurium precipitation (18), purifying to obtain Te with a purity of higher than 99.99%. The filtrate produced is used for extracting $Bi_2O_3$ with a purity of higher than 99.99% when Bi content in the raw material is $\geq 2\%$. Acidic waste solution produced during the process could be returned to the leaching step for recycle.

18 Claims, 1 Drawing Sheet

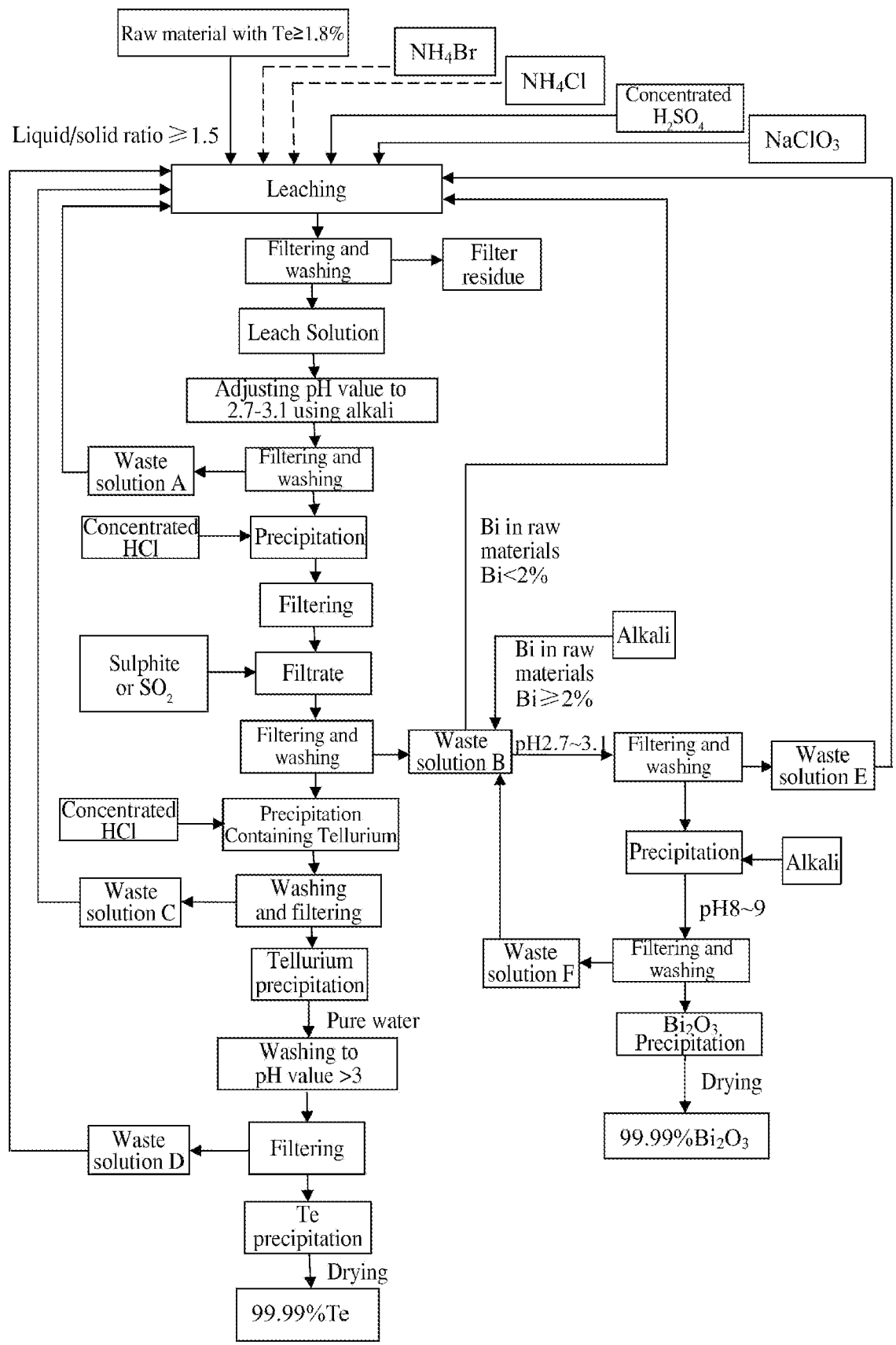

METHOD OF EXTRACTING TE AND BISMUTH OXIDE AND RECOVERING BYPRODUCTS

CROSS-REFERENCE TO RELATED APPLICATIONS

This application is the U.S. national stage of International Patent Application No. PCT/CN2009/072096, filed on Jun. 2, 2009 and entitled "Method of Extracting Te and Bismuth Oxide and Recovering Byproducts," which claims the benefit of priority from Chinese Patent Application No. 200810044496.7, filed Jun. 2, 2008. The disclosures of the foregoing applications are incorporated herein by reference in their entirety.

FIELD OF THE INVENTION

The present invention relates to smelting processes for scattered elements, rare metals and noble metals, and more specifically, to processes of extracting highly pure tellurium directly from various raw materials containing tellurium by hydrometallurgical methods, extracting highly pure bismuth trioxide when the raw material comprises bismuth and collectively recovering other byproducts, which falls within the field of hydrometallurgy; while it substantially achieves no Three Wastes (waste gas, waste water and industrial residue) and zero emission, which falls within the field of environmental protection.

BACKGROUND OF THE INVENTION

Tellurium is an essential elemental in modern science and belongs to scattered elements. At present, the extraction and recovery of tellurium is primarily achieved by collectively recovering from byproducts during nonferrous metal smelting processes, for example, recovering from anode slimes of copper and lead etc., or extracting from primary tellurium ores.

Tellurium may be incorporated into steels to increase ductility, and serve as brightener in electroplating solution, catalyst in petroleum cracking, coloring material for glass, and also may be added into lead to increase its strength and corrosion resistance. Highly pure tellurium may be used as an alloy component for thermoelectric materials; bismuth telluride is a good refrigeration material; semi-conducting compound $As_{32}Te_{48}Si_2O$ is a material for manufacturing storage devices of computer; ultrapure single crystal tellurium is a novel infrared material. Highly pure tellurium plays important roles although little is used. Tellurium is also one of the best primary materials for solar cell, which has the largest conversion coefficient, relatively low cost and best benefit. Cost is essential for popularization of solar energy, the eternal energy source, and it is thus critical to obtain advancement in the process technology of tellurium extraction, minimize the cost, and achieve substantially no Three Wastes, zero emission and best product quality in practical production.

There have been various reports and patents concerning extracting tellurium from tetradymites or other Te-containing raw materials with wet process, and lots of works have been done by the experts. For example, Chinese patent application No. 99111440.X entitled "Process of Extracting Fine Tellurium from Tellurium Polymetallic Ores" discloses a process of extracting tellurium with wet process, in which hydrochloric acid is used for leaching, the leach solution is reduced by sulfur dioxide gas and then precipitated to give crude tellurium powders which subsequently react with oxidants in the hydrochloric acid solution to yield an intermediate product, $TeO_2$, and fine tellurium product is finally collected upon electrolysis. Although fine tellurium with 99.99% purity can be obtained after electrolysis employing the hydrometallurgical method disclosed by this application, the whole process has relatively high production cost, high energy consumption, low recovery rate and low yields, wherein serious environmental problems such as large amount of waste gases and waste water occurs and other byproducts are not comprehensively utilized.

In another case, Chinese patent application No. 93115389.1 entitled "A Production Process of Extracting Fine Tellurium from Primary Tellurium Ores by Wet Process" discloses a method of producing fine tellurium from primary tellurium ores, which comprises leaching tellurium and bismuth by high temperature oxidation in hydrochloric acid medium, reducing by sulfur dioxide to give crude tellurium powder, and obtaining fine tellurium through chemical purification and electrolytic purification, and further obtaining an intermediate bismuth-containing product upon hydrolysis of the neutralized bismuth-containing reduction solution. This method requires external heating to 80° C. or more, which doubtlessly increases cost, and employs an electrolysis process leading to issues such as high energy consumption. In addition, the waste solution and waste residues are not comprehensively utilized during the production process whereby serious environmental problems and resource wasting issues emerges.

In bismuth recovery from tetradymites by hydrometallurgical methods, in general, iron is added into the acidic solution after recovering tellurium for reduction, yielding primary spongy bismuth product of low purity. The spongy bismuth produced by this method has low values, high cost and poor economical benefits. It has not been reported to directly produce 99.99% $Bi_2O_3$ from tetradymites.

With regards to the Three Wastes concerning environmental protection, less waste gases and residues are produced in hydrometallurgical methods than in pyrometallurgy methods, whilst much more waste water is produced, which is a serious environmental issue for hydrometallurgy.

SUMMARY OF THE INVENTION

The present invention is directed to certain drawbacks and problems present in hydrometallurgy of the existing technologies, such as low leach rate, low recovery rate, relatively high production cost, high energy consumption, low product quality; serious environmental problems such as large amount of waste gases and waste water, as well as disadvantages as inability to achieve comprehensive exploitation of waste residues; and the electrolysis employed during isolation and purification which causes issues like high energy consumption, low yield and high cost etc. The present invention proposes a new method with high recovery rate, low cost, low energy consumption, high quality, collective recovery and substantially no Three Wastes and zero emission. The method employed in the present invention to recycle the waste water and recover in closed circuit is the first successful practice, hence a milestone, in the history of environment protection in hydrometallurgy.

Referring to the illustration in FIG. 1, a method for direct extraction of highly pure tellurium from raw materials by wet process is proposed in the present invention. More particularly, the hydrometallurgical method of extracting tellurium according to the present invention comprises steps of material selecting, leaching the selected material, and reducing and purifying the leach solution. In this method, the material selecting step includes: selecting raw material, usually mineral raw material, with tellurium content $\geq 1.8\%$, e.g., fine mineral powder with tellurium content $\geq 1.8\%$ and 80 mesh or above, or anode slime with tellurium content $\geq 1.8\%$, and/or other raw materials with tellurium content $\geq 1.8\%$, and placing the selected raw material into a leaching trough; the leaching system comprises $H_2SO_4$, $Cl^-$, $Br^-$, $NH_4^+$ and $NaClO_3$. The detailed leaching step includes to the leaching trough in this order: (1) adding a solution and/or solid containing $Cl^-$, $Br^-$ and $NH_4^+$ at a ratio of $Cl^- \geq 115$ kg, $Br \geq 16$ kg and $NH_4^+ \geq 62$ kg per ton of the raw material, with the liquid-solid ratio between the liquid and raw material in the leaching trough $\geq 1.5$, and leaching at room temperature for 1 to 3 hours, (2) then adding concentrated $H_2SO_4$ in an amount of 500 to 1000 kg per ton of raw material and leaching for 1 to 3 hours, wherein the leaching temperature may rise spontaneously to 45-65° C. due to the heat released by concentrated sulfuric acid, and the residual acidity of the solution after leaching upon addition of concentrated $H_2SO_4$ is required to be 0.5 to 1.5 N, (3) further adding $NaClO_3$ in an amount of 25 to 50 kg of $NaClO_3$ per ton of raw material, leaching under stirring for 2 hours or more, wherein oxidation reaction occurs upon addition of $NaClO_3$ while heat is released, which leads to an spontaneous increase of temperature up to 75-95° C.; filtering and washing, and then collecting leach solution. Using the method of the present invention, the washing residue (leaching residue) has a content of $Te \leq 0.035\%$ and can be used as raw material for cement or cement bricks; the collected leach solution is reduced and purified with existing techniques so as to give tellurium with purity of 99.99% or more.

The collected leach solution mentioned above may also be used to produce highly pure product with the following method:

impurity separation by precipitation process: the leach solution is adjusted to pH 2.7 to 3.1 with bases, filtered and washed to obtain waste solution A and a precipitate, wherein the waste solution A comprises $H^+$, $SO_4^{2-}$, $NH_4^+$, $Cl^-$, $Br^-$ and other ions leached out from the raw material, and Te remains in the precipitate; the precipitate with hydrochloric acid, filter and collect filtrate which is reduced and purified with existing technologies to yield tellurium with purity of 99.99% or more.

In the present invention, in addition to employ the existing reduction and purification method for the filtrate, the following method may be used for reduction and purification to obtain tellurium with purity of 99.99% or more:

reduction: sulfite or $SO_2$ gas is introduced into the collected filtrate for reduction until $Te \leq 0.03$ g/l, tellurium is precipitated, filtered and washed to obtain a tellurium-containing precipitate and filtrate B;

purification: concentrated HCl is added at a liquid-solid ratio $\geq 1:1$ into the above tellurium-containing precipitate for washing, wherein other impurities in the washed tellurium precipitate may be leached by concentrated HCl since tellurium is not soluble in HCl, a tellurium precipitate and waste solution C are obtained by filtering and washing, the tellurium precipitate is washed with pure water until pH>3, filtered to obtain tellurium precipitate and waste solution D, and the tellurium precipitate is baked to yield fine tellurium powder with purity of 99.99% or more which is sintered at 400 to 500° C. to give block tellurium product with purity of 99.99% or more.

According to the preferred specific embodiment of the present invention, in the leaching step, the solution and/or solid containing $Cl^-$, $Br^-$ and $NH_4^+$ is a solution and/or solid of $NH_4Br$ and $NH_4Cl$, and $Cl^-$, $Br^-$ and $NH_4^+$ are complexing and catalytic leaching agents; the leach solution in the impurity separation step of the precipitation process is adjusted to pH 2.9 with bases; said bases are NaOH and/or $NH_3$; the sulfite in the reduction step is $Na_2SO_3$.

The waste solution A, waste solution C and/or waste solution D produced in the above steps are returned to the step (1) of the leaching step for leaching, and it will not be necessary to add further solution and/or solid containing $Cl^-$, $Br^-$ and $NH_4^+$ which can be completely replaced by the waste solutions for leaching when the amount of $Cl^-$, $Br^-$ and $NH_4^+$ in the waste solutions satisfies that $Cl^- \geq 115$ kg, $Br^- \geq 16$ kg and $NH_4^+ \geq 62$ kg for each ton of raw material. In addition, the concentration of $Cl^-$, $Br^-$ and $NH_4^+$ in the waste solutions increases as they are returned for leaching for more and more times, that is, the complexing and catalytic leaching effect is getting better, leading to a continuous decrease of leaching time and continuous increase in leach rate, and the tellurium content in the leached residue may be less than 0.02% after leaching with the waste solution for multiple times.

When the bismuth content is $\geq 2\%$ in the raw material, filtrate B is collected in the above reduction step, and existing method can be used to extract $Bi_2O_3$, for example: the filtrate B is adjusted with base added to pH 8-9 and heated to 80-90° C. so as to convert the precipitate to a yellow $Bi_2O_3$ precipitate, which is filtered and washed to obtain $Bi_2O_3$ precipitate, said precipitate is then baked to yield $Bi_2O_3$ with purity of 99.99% or more. In addition, a new method is employed in the present invention for extraction of $Bi_2O_3$: firstly the filtrate B is adjusted with bases to pH 2.7-3.1, preferably pH 2.9, while bismuth is precipitated in the forms of BiO(OH), $Bi(OH)_3$ and BiOCl, filtered and washed to obtain bismuth-containing precipitate and waste solution E which contains impurities; the bismuth-containing precipitate is transferred into an agitator with a pure water:solid ratio $\geq 1:1$ and blended with bases added therein under stirring to adjust pH to 8-9, heated to 80-90° C. so as to convert the precipitate to a yellow $Bi_2O_3$ precipitate, which is filtered and washed to obtain waste solution F and $Bi_2O_3$ precipitate, the precipitate is then baked to yield $Bi_2O_3$ with purity of 99.99% or more; other conventional methods may also be used to convert bismuth-containing precipitate for $Bi_2O_3$ purification.

Waste solution E may be returned to the step (1) of the leaching step of tellurium extraction for use. When the bismuth content is <2% in the raw material, filtrate B can be used the same as waste solution A, waste solution C, waste solution D and waste solution E to return to the step (1) of the leaching step for leaching. Said bases are NaOH and/or $NH_3$; waste solution F is basic, which may be used as a base in the process for $Bi_2O_3$ purification to adjust pH to 2.7-3.1, or may be returned to the process of tellurium extraction to adjust pH to 2.7-3.1, preferably pH 2.9.

The present invention also provides a method for collective recovery of byproducts, wherein, as the waste solution being returned and used for leaching for multiple cycles, the concentration of the metals with trivial amount in the leach solution keeps increasing until reaching the recovery condition, and then the metals are recovered. More specifically, the method of collective recovery of byproducts according to the present invention includes treatment of the waste solutions from the hydrometallurgical process for tellurium extraction and/or from the hydrometallurgical process for bismuth trioxide extraction. In the present invention, as the returned waste solutions, partially or fully replacing the solution and/or solid containing $Cl^-$, $Br^-$ and $NH_4^+$, are used for leaching for multiple cycles, the concentration of other scarce noble metals such as Au, Ag, Pt, Rh, Pd, Co, Ni, Sn, Cu, Se included in the raw material continuously increases, and recovery may be carried out by conventional methods when the collective recovery condition is arrived; further, when the bismuth content in the raw material is <2%, bismuth is collectively recovered together with these scarce noble metals after leaching for multiple cycles. In addition, $Na_2SO_4.10H_2O$ or $(NH_4)_2SO_4$ crystals will precipitate from the waste water (waste solution) during recycling and may be recovered as byproducts. Namely, the present invention also provides a method for collective recovery of byproducts, wherein the $Na_2SO_4.10H_2O$ or $(NH_4)_2SO_4$ crystals precipitated from waste solution during recycling are recovered. Specifically, the waste solution is the waste solution produced during the hydrometallurgical process for tellurium extraction and/or during the hydrometallurgical process for bismuth trioxide extraction of the present invention.

The present method may be used for production and recovery for all tellurium-containing raw materials to give products in the form of fine tellurium powders or elementary block products with purity of 99.99% or more; when Bi in the raw material is $\geqq 2\%$, it may be used for production and recovery of $Bi_2O_3$ products with purity of 99.99% or more; and it may also be used for collective recovery of other products or crude products.

Since elementary substances or compounds of scattered, rare elements like tellurium and bismuth are all substantially soluble in the $H_2SO_4+Cl^-+Br^-+NH_4^++NaClO_3$ system, the present invention employs a leaching system containing $H_2SO_4$, $Cl^-$, $Br^-$, $NH_4^+$ and $NaClO_3$, and integrates acidic oxidation leaching, complexation leaching and catalytic leaching into a comprehensive leaching method. In the first leaching process, after adding the solution and/or solid containing $Cl^-$, $Br^-$ and $NH_4^+$, waste solution can be recycled in the subsequent production to partially or fully replacing the solution and/or solid containing $Cl^-$, $Br^-$ and $NH_4^+$ for leaching, which saves the cost and is beneficial for environment protection as almost no waste solution is discharged; furthermore, the concentration of $Cl^-$, $Br^-$ and $NH_4^+$ in the waste solution increases as the times of leaching increase, and the complexing leaching effect and catalytic leaching effect of these ions causes the leaching time with waste solution to decreases and leach rate to increases, while the leach rate of other metals increases as well. It has been demonstrated in experiments that the leach rate of tellurium and bismuth may be up to 99.5% and above and the leach rate of other scarce noble metals may be up to 99% after multiple recycling of waste solution, such high leach rate has never been reported previously. Concentrated sulfuric acid is added into the leaching system and spontaneously releases heat, thus allowing the temperature during the leaching process to rise to the desired temperature without heating; further, sodium chlorate is used for oxidative leaching after concentrated sulfuric acid leaching, and leaching temperature further increases and can achieve the desired temperature without heating due to the participation of sodium chlorate in the exothermic oxidation reaction, thereby the higher leaching rate can be achieved without too higher temperature, which saves the cost and shortens the process. Fine tellurium powder with purity of 99.99% or more can be obtained after baking, or block-shaped tellurium may be produced after sintering at 400-500° C. Abandoning expensive electrolysis method and simplifying the hydrometallurgical procedure for tellurium, the present method is more convenient, effective and energy-saving while improving the quality of the product.

In the present invention, the leach solution is adjusted during the process of tellurium purification to pH 2.7-3.1, which step is sufficiently utilized so that many impurities, such as Fe, Cu, Se, Mg, Al, Si, Co, Ni, $Cl^-$, $SO_4^{2-}$, $NH_4^+$, may be separated and precipitated as $BiO(OH)$, $Bi(OH)_3$, $BiOCl$ and $H_2TeO_3$, $Te(OH)_4$, the precipitates are then dissolved by concentrated HCl and the isolated tellurium is reduced by sulfite or $SO_2$, the resulting acidic solution, as a bismuth-containing solution, is subjected to pH adjustment, and then filtered and washed followed by baking to give $Bi_2O_3$ with purity of 99.99% or more. Such method produces high quality $Bi_2O_3$ product with high quality, and such method has low cost, good operability and short procedure, and is an economic and efficient hydrometallurgical method for $Bi_2O_3$ recovery.

Some scarce noble metals, such as Au, Ag, Pt, Rh, Pd, Co, Ni, Sn, Cu, have low leach rate in $HCl+NaClO_3$ medium, generally at about 60%. However, it has been demonstrated in experiments that up to 99% of leaching may be achieved during the waste water recycling employed in the present process. Although the content of these metals is low, the concentration thereof continue to increase as the waste solution in which they present are recycling for multiple times, and the metals can be recovered using existing recovery method when the condition for collective recovery is achieved; washed residue may be used as raw material for cement or cement bricks etc. after it is washed and passes the test; $Na_2SO_4.10H_2O$ or $(NH_4)_2SO_4$ crystals that may precipitate during the recycling of waste water may be recovered and used as other chemical raw materials. As seen, the process method provided by the present invention has simple procedure, low cost, high quality, strong adaptability, recover in closed circuit, and also achieves substantially no Three Wastes and zero emission in the hydrometallurgical process, and is beneficial for environment protection.

Based on the idea and practice of hydrometallurgy with no Three Wastes and zero emission proposed in the present invention, no emission of exhaust gases is essentially achieved after the small amount of exhaust gas produced during the production procedure and that from the factory building are absorbed by bases and acids; waste residues may be used as raw material for cement bricks or cement production after multiple washes and reaching the standard; waste water is recycled in closed circuit, the increased amount of water during the production process is entrained in waste residues and crystallizing water for the byproduct $Na_2SO_4.10H_2O$, while the entrained water in the product may also be recycled during the baking process. Hence, it is practically proved that material balance can be essentially achieved.

With regards to Three Wastes that are concerned in environmental protection, hydrometallurgy process generates less waste gas and waste residues than pyrometallurgy, but large amount of waste water is produced, which is the major environmental problem present in hydrometallurgy. One of the successes of the present invention is in that waste water is recycled and recovered in closed circuit, which is the first successful practice, hence a milestone, in the history of environment protection in hydrometallurgy. It has been discovered in the present invention that the concentrations of complex ions like $Cl^-$, $Br^-$ and $NH_4^+$ in the waste water keep increasing as recycling times increase, which results into a more prominent effect of complexing leaching and catalytic leaching. A theory for waste water recycling is proposed in the invention as follows: many ions and compounds with functions of complexation, catalysis and oxidation-reduction exist in the waste water in the hydrometallurgical process, and they can be repeatedly used for leaching, while reinforcing the leaching effect, improving leach rate, shortening leach time, and saving the amount of leaching agents used. This is the theory for waster water returning and recycling, such theory needs to be further testified in more hydrometallurgical projects, so as to determine whether it is adaptable for all hydrometallurgical systems and whether it can become a principle in hydrometallurgy.

BRIEF DESCRIPTION OF THE FIGURES

FIG. 1 is a flowchart of the hydrometallurgical process for extracting tellurium and bismuth trioxide.

DETAILED DESCRIPTION OF THE INVENTION

The present invention is described below in more details in connection with Examples. In the following six examples, although the leaching conditions are different from each other, a leach rate of 99.5% Te and 99.5% Bi is reached after leaching completely with waste water in all examples, which clearly demonstrate the advantage of leaching integrating acidic oxidation leaching, complexing leaching and catalytic leaching in the present invention; the recycled waste water is substantially balanced. The concentration of $Cl^-$ in the waste water increase with the increase of recycling times, and excellent leaching effect has been demonstrated by data of multiple leaching examples. When the concentration of $Cl^-$ increases to the saturated concentrations of its compounds such as NaCl and $FeCl_2$, they will precipitate and may subsequently enter the collective recovery procedure; whereas, the amount of $NH_4^+$ and $Br^-$ will be somehow consumed, and needs to be supplemented when the data of $NH_4^+$ and $Br$ analyzed and controlled in production drops. The content of individual components in the raw material is in percent by weight. In the present invention, the liquid-solid ratio is based on the convention in industrial production in the art, wherein the dimension for liquid is volume in $m^3$, and the dimension for solid is weight in T.

As shown in the above table, during leaching, adding $6 m^3$ of $H_2O$ into 3 tons of raw material followed by adding 525 kg $NH_4Cl$ and 60 kg $NH_4Br$, leaching for 3 h at ambient temperature; then adding 3 tons of concentrated $H_2SO_4$ and leaching for another 3 h with the temperature spontaneously rising to 65° C.; then adding 150 kg $NaClO_3$ and leaching for 5 h under stirring with the temperature spontaneously rising to 95° C.; filtering, washing and collecting filtrate, and it was found upon examination that the leach rate of Te in the leach solution is 98.3% and that of Bi is 98.6%, the residual acidity is 1.5 N.

Full analysis data of the leach solution and leach residue are shown in the table below:

| | Name | | | | | | | | | | | | |
|---|---|---|---|---|---|---|---|---|---|---|---|---|---|
| | Te | Bi | Cu | Fe | Pb | Ca | Mg | Ag | Al | $SiO_2$ | Co | Ni | Se |
| Leach solution g/l | 29.1 | 44.1 | 9.52 | 12.5 | 0.002 | 0.27 | 4.84 | 0.011 | 11 | 1.58 | 0.02 | 0.2 | 0.11 |
| Leach residue % | 0.035 | 0.029 | 0.035 | 14.61 | 0.0011 | 16.28 | 3.12 | 0.0001 | 3.52 | 3.4 | 0.0007 | 0.0005 | 0.015 |

The full analysis data of the leach solution and leach residue suggest that Te, Bi and other scarce noble metals can all be leached with this acidic oxidative, complexing, catalytic leaching system. The leach rate of Ca and Pb is rather low since $H_2SO_4$ is used for leaching, which is beneficial for separation in the purification process.

Suitable condition for crude tellurium powder reduction is an acidity of 0.5 to 1.5N, and since the residual acidity of the leach solution in this example is 1.5N, it is suitable for tellurium preparation with conventional methods. The leach solution is added with $SO_2$ gas for reduction until the content of Te in the solution is 0.008 g/l, and filtered and washed, and 99.9916% Te is obtained after electrolysis of the precipitate. Waste solution separated by filtering and washing is preserved for use in the next production.

EXAMPLE 1

3 tons of tetradymites are crushed to 80 meshes, and the content of major elements in the raw material is shown in the table below:

EXAMPLE 2

3 tons of tetradymites are crushed to 100 meshes, and the content of major elements in the raw material is shown in the table below:

| | Name | | | | | | | | | | |
|---|---|---|---|---|---|---|---|---|---|---|---|
| | Te | Bi | Cu | Fe | Pb | Ca | S | Al | $SiO_2$ | Co | Ni | Se |
| content % | 5.8 | 9.12 | 1.8 | 15.5 | 0.019 | 17.4 | 4.11 | 4.08 | 7.44 | 0.0059 | 0.0038 | 0.0052 |

Liquid-solid ratio is 2, and leaching condition and results are shown in the table below:

| Amount of liquid added | Amount of $NH_4Cl$ added | Amount of $NH_4Br$ added | Leach time | Concentrated $H_2SO_4$ | | | $NaClO_3$ | | | Residual acidity | Te leach rate | Bi leach rate |
|---|---|---|---|---|---|---|---|---|---|---|---|---|
| | | | | Amount added | Leach time | Leach temp. | Amount added | Leach time | Leach temp. | | | |
| $6 m^3$ $H_2O$ | 525 kg | 60 kg | 3 h | 3 T | 3 h | 65° C. | 150 kg | 5 h | 95° C. | 1.5 N | 98.3% | 98.6% |

| Name | | | | | | | | | | | | |
|---|---|---|---|---|---|---|---|---|---|---|---|---|
| | Te | Bi | Cu | Fe | Pb | Ca | S | Al | SiO$_2$ | Co | Ni | Se |
| content % | 6.61 | 9.63 | 2.03 | 16.2 | 0.0177 | 16.8 | 3.92 | 4.51 | 7.54 | 0.0054 | 0.0045 | 0.005 |

Liquid-solid ratio is 2, and leaching condition and results are shown in the table below:

| Amount of liquid added | Amount of NH$_4$Cl added | Amount of NH$_4$Br added | Leach time | Concentrated H$_2$SO$_4$ | | | NaClO$_3$ | | | Residual acidity | Te leach rate | Bi leach rate |
|---|---|---|---|---|---|---|---|---|---|---|---|---|
| | | | | Amount added | Leach time | Leach temp. | Amount added | Leach time | Leach temp. | | | |
| 6 m$^3$ waste solution | 230 kg | 48 kg | 2 h | 2.9 T | 2.5 h | 60° C. | 150 kg | 4 h | 90° C. | 1.4 N | 99.1% | 99.2% |

As shown in the above table, adding 6m$^3$ of waste solution separated from Example 1 into 3 tons of raw material followed by adding 230 kg NH$_4$Cl and 48 kg NH$_4$Br, leaching for 2 h at ambient temperature; then adding 2.9 tons of concentrated H$_2$SO$_4$ and leaching for another 2.5 h with the temperature spontaneously rising to 60° C.; then adding 150 kg NaClO$_3$ and leaching for 4h under stirring while the temperature spontaneously rising to 90° C.; filtering, washing and collecting filtrate, and it was found upon examination that the leach rate of Te in the leach solution is 99.1% and that of Bi is 99.2%, the residual acidity is 1.4N.

Full analysis data of the leach solution and leach residue are shown in the table below:

| | Name | | | | | | | | | | | | |
|---|---|---|---|---|---|---|---|---|---|---|---|---|---|
| | Te | Bi | Cu | Fe | Pb | Ca | Mg | Ag | Al | SiO$_2$ | Co | Ni | Se |
| Leach solution g/l | 31.1 | 44.2 | 18.5 | 20.3 | 0.003 | 0.21 | 5.02 | 0.02 | 15 | 1.5 | 0.03 | 0.35 | 0.18 |
| Leach residue % | 0.031 | 0.027 | 0.14 | 15.1 | 0.0025 | 16.2 | 3.4 | 0.0015 | 4.18 | 3.8 | 0.0005 | 0.0075 | 0.016 |

The leach solution is adjusted with NaOH solution to pH 2.7 to afford a mixture of tellurium and bismuth precipitates, the precipitates are then filtered and washed, and the resulting waste solution are to be used as leach solution for tellurium extraction in the next production.

The above-mentioned precipitates after washing are dissolved by concentrated HCl and then filtered, and SO$_2$ gas is added into the leach solution for reduction until the content of Te in the solution is 0.01 g/l. After filtering and washing, the precipitate is a tellurium precipitate, the filtrate is a bismuth-containing solution, and the results of full analysis are shown in the following table:

| | Name | | | | | | | | | | | | |
|---|---|---|---|---|---|---|---|---|---|---|---|---|---|
| | Te | Bi | Fe | Cu | Ca | Mg | Pb | Al | SiO$_2$ | Ag | Co | Ni | pH |
| Filtrate g/l | 0.01 | 200.08 | 1.15 | 0.05 | 0.01 | 0.31 | 0.001 | 1.01 | 0.005 | N/A | N/A | N/A | <0.5 |
| Te precipitate % | 99.68 | 0.06 | 0.04 | 0.11 | 0.13 | 0.003 | 0.001 | 0.05 | 0.003 | N/A | N/A | N/A | |

The Te precipitate is filtered, washed and then electrolyzed to give 99.992% Te.

$Bi_2O_3$ purification: adjusting pH with NaOH to 8-9, heating at 84° C. for 3.5 h under stirring to produce yellow $Bi_2O_3$, filtering and washing to obtain $Bi_2O_3$ precipitate and basic filtrate; baking the precipitate to prepare a 99.991% $Bi_2O_3$ product, and the basic filtrate may be maintained for use for pH adjustment in the next $Bi_2O_3$ extraction.

EXAMPLE 3

3 tons of tetradymites are crushed to 100 meshes, and the content of major elements in the raw material is shown in the table below:

| | Name | | | | | | | | | | | |
|---|---|---|---|---|---|---|---|---|---|---|---|---|
| | Te | Bi | Cu | Fe | Pb | Ca | S | Al | $SiO_2$ | Co | Ni | Se |
| Content % | 6.9 | 9.82 | 2.3 | 15.4 | 0.018 | 16.3 | 4.32 | 4.75 | 7.71 | 0.004 | 0.0051 | 0.0043 |

The waste solution separated from example 2 is added at a liquid-solid ratio of 2, and leaching condition and results are shown in the table below:

| Amount of liquid added | Amount of $NH_4Cl$ added | Amount of $NH_4Br$ added | Leach time | Concentrated $H_2SO_4$ | | | $NaClO_3$ | | | Residual acidity | Te leach rate | Bi leach rate |
|---|---|---|---|---|---|---|---|---|---|---|---|---|
| | | | | Amount added | Leach time | Leach temp. | Amount added | Leach time | Leach temp. | | | |
| 6 m³ waste solution | 225 kg | 60 kg | 2 h | 2.86 T | 1 h | 45° C. | 150 kg | 4 h | 95° C. | 1.2 N | 99.7% | 99.6% |

Detailed description for procedures which are the same as Example 2 is omitted herein. Full analysis data of the leach solution and leach residue are shown in the table below:

| | Name | | | | | | | | | | | | |
|---|---|---|---|---|---|---|---|---|---|---|---|---|---|
| | Te | Bi | Cu | Fe | Pb | Ca | Mg | Ag | Al | $SiO_2$ | Co | Ni | Se |
| Leach solution g/l | 31.85 | 44.9 | 27.1 | 25.1 | 0.0035 | 0.18 | 6.03 | 0.03 | 16.3 | 1.6 | 0.041 | 0.45 | 0.25 |
| Leach residue % | 0.023 | 0.021 | 0.11 | 15.5 | 0.0016 | 16.3 | 3.5 | 0.0018 | 4.25 | 3.83 | 0.0001 | 0.0011 | 0.017 |

The leach solution is adjusted with NaOH solution to pH 2.9 to afford a mixture of tellurium and bismuth precipitates, the precipitates are then filtered and washed, and the resulting waste solution are to be used as leach solution for tellurium extraction in the next production.

The above-mentioned precipitates after washing are dissolved by concentrated HCl and then filtered, and $Na_2SO_3$ is added into the leach solution for reduction until the content of Te in the solution is 0.02 g/l. After filtering and washing, the precipitate is a tellurium precipitate, the filtrate is a bismuth-containing solution, and the results of full analysis are shown in the following table:

| | Name | | | | | | | | | | | | |
|---|---|---|---|---|---|---|---|---|---|---|---|---|---|
| | Te | Bi | Fe | Cu | Ca | Mg | Pb | Al | $SiO_2$ | Ag | Co | Ni | pH |
| Filtrate g/l | 0.02 | 200.07 | 1.12 | 0.06 | 0.013 | 0.25 | 0.0012 | 1.08 | 0.005 | trace | trace | trace | <0.5 |
| Te precipitate % | 99.49 | 0.12 | 0.04 | 0.15 | 0.16 | 0.004 | 0.0009 | 0.03 | 0.003 | trace | trace | trace | |

The Te precipitate above is washed with concentrated HCl added at a liquid-solid ratio of 1:1 to dissolve other impurities, filtered. The precipitate is washed with pure water to pH 4 and then filtered, waste solution is to be used as leach solution for tellurium extraction in the next production, and Te precipitate is baked to give fine tellurium powder with purity of 99.9925%. Examination results of the product are shown in the following table:

| | Name | | | | | | | | |
|---|---|---|---|---|---|---|---|---|---|
| | Mg | Pb | Se | Ni | Ag | Sb | Bi | Cu | Mn |
| ppm | 0.0912 | 0.6 | 0.75 | 0.64 | 0.81 | 0.469 | 10 | 10 | 0.129 |

| | Name | | | | | | | |
|---|---|---|---|---|---|---|---|---|
| | Co | Zn | Ca | Fe | As | Al | Sn | S | Na |
| ppm | 0.587 | 0.31 | 0.43 | 10 | 0.3 | 0.4 | 0.23 | 0.11 | 0.5 |

$Bi_2O_3$ purification: the above bismuth-containing filtrate is adjusted with the basic filtrate from $Bi_2O_3$ extraction in Example 2 and NaOH to pH 2.7, filtered and washed, resultant precipitate is a mixture of BiO(OH), $Bi(OH)_3$ and BiOCl and resultant filtrate can be used as leach solution for tellurium extraction in the next production (waste solutions to be used as leach solution for tellurium extraction in the next production that is produced in individual steps of this Example 3 may be discharged together into a waste solution pool). The analysis data of the filtrate and precipitate is shown in the following table:

| | Name | | | | | | | | | | |
|---|---|---|---|---|---|---|---|---|---|---|---|
| | Te | Bi | Fe | Cu | Ca | Mg | Al | $SiO_2$ | Ag | Co | Ni |
| Filtrate g/l | 0.02 | 0.35 | 1.05 | 0.01 | 0.01 | 0.31 | 0.98 | 0.003 | trace | trace | trace |
| Precipitate % | 0.001 | 99.8 | 0.003 | 0.001 | 0.0005 | 0.0003 | 0.0008 | 0.003 | trace | trace | trace |

The aforementioned bismuth-containing precipitate mixture is transferred into a blender, and blended with pure water added at a liquid-solid ratio of 1.5, and then adjusted with NaOH to pH 8-9, heated under stirring for 3 h at 80° C. to produce yellow $Bi_2O_3$. After filtering and washing, $Bi_2O_3$ precipitate and basic filtrate are obtained, the precipitate is baked to prepare a 99.993% $Bi_2O_3$ product, and the basic filtrate can be maintained for use for pH adjustment in the next $Bi_2O_3$ extraction.

EXAMPLE 4

12 tons of tetradymites are crushed to 80 meshes, and the content of major elements in the raw material is shown in the table below:

| | Name | | | | | | | | | | | |
|---|---|---|---|---|---|---|---|---|---|---|---|---|
| | Te | Bi | Cu | Fe | Pb | Ca | S | Al | $SiO_2$ | Co | Ni | Se |
| content % | 2.01 | 2.89 | 0.01 | 8.29 | 0.001 | 13.1 | 28.56 | 9.2 | 16.47 | 0.005 | 0.003 | 0.017 |

Leaching is carried out in three portions with 4 tons each portion, with a liquid-solid ratio of 1.5, using the waste solution produced in Example 3. Leaching data is shown in the table below:

| Name | Amount of liquid added | Adding $NH_4Br$ | | Adding conc. $H_2SO_4$ | | | Adding $NaClO_3$ | | | Residual acidity | Te leach rate | Bi leach rate |
|---|---|---|---|---|---|---|---|---|---|---|---|---|
| | | Amount added | Leach time | Amount added | Leach time | Leach temp. | Amount added | Leach time | Leach temp. | | | |
| 1st portion | 6 m³ waste solution | 20 kg | 1 h | 2.18T | 3 h | 53° C. | 140 kg | 4.5 h | 75° C. | 0.6N | 99.5% | 99.7% |

-continued

| Name | Amount of liquid added | Adding $NH_4Br$ | | Adding conc. $H_2SO_4$ | | | Adding $NaClO_3$ | | | Residual acidity | Te leach rate | Bi leach rate |
|---|---|---|---|---|---|---|---|---|---|---|---|---|
| | | Amount added | Leach time | Amount added | Leach time | Leach temp. | Amount added | Leach time | Leach temp. | | | |
| $2^{nd}$ portion | 6 m³ waste solution | N/A | 2 h | 2.16T | 2.5 h | 54° C. | 140 kg | 4 h | 86° C. | 0.7N | 99.58% | 99.8% |
| $3^{rd}$ portion | 6 m³ waste solution | N/A | 2 h | 2.15T | 2 h | 54° C. | 140 kg | 4 h | 86.5° C. | 0.75N | 99.6% | 99.82% |

Detailed description for procedures which are the same as Example 3 is omitted, with the exception that 20 kg $NH_4Br$ is only added in the first portion of raw material with no $NH_4Br$ added in the other two portions, and no $NH_4Cl$ is added in all three portions. Full analysis data of the leach solution and leach residue are shown in the table below:

| | | Name | | | | | | | | | | |
|---|---|---|---|---|---|---|---|---|---|---|---|---|
| | | Te | Bi | Cu | Fe | Pb | Ca | Mg | Al | $SiO_2$ | Co | Ni | Se |
| $1^{st}$ portion | Leach solution g/l | 12.3 | 18.1 | 0.1 | 10.3 | 0.001 | 0.37 | 4.5 | 13.1 | 1.7 | 0.025 | 0.021 | 0.02 |
| | Leach residue % | 0.018 | 0.019 | 0.003 | 8.0 | 0.0008 | 19.3 | 3.5 | 9.1 | 16.1 | 0.0003 | 0.0005 | 0.005 |
| $2^{nd}$ portion | Leach solution g/l | 13.1 | 19.1 | 0.12 | 10.1 | 0.001 | 0.28 | 3.8 | 13.8 | 1.5 | 0.021 | 0.025 | 0.021 |
| | Leach residue % | 0.019 | 0.02 | 0.002 | 7.5 | 0.0009 | 19.5 | 3.2 | 8.7 | 15.9 | 0.0005 | 0.0003 | 0.008 |
| $3^{rd}$ portion | Leach solution g/l | 12.8 | 18.9 | 0.08 | 11.3 | 0.0008 | 0.21 | 4.1 | 13.5 | 1.6 | 0.0022 | 0.028 | 0.025 |
| | Leach residue % | 0.017 | 0.017 | 0.001 | 7.8 | 0.0007 | 19.1 | 3.1 | 8.6 | 15.8 | 0.0004 | 0.0004 | 0.007 |

Due to the use of waste water, the concentration of $Cl^-$, $Br^-$, $NH_4^+$, $Fe^{2+}$, $Al^{3+}$ keeps increasing, and the leach rate of $Fe^{2+}$, $Al^{3+}$ keeps decreasing until saturation, which is advantageous for the purification requirement of the subsequent process. Since $Cl^-$, $Br^-$, $NH^{4+}$ have strong complexing effects, the leach rate of scarce noble metals like $Cu^{2+}$, $Co^{2+}$, $Ni^{2+}$, $Ag^+$ continuously increase to 99% and above, and the objective of collective recovery is achieved.

The three portions of leach solution is adjusted with $NH_3$ to pH 2.7, 2.9 and 3.1 respectively, the resulting Te—Bi precipitates are combined and dissolved by concentrated HCl added, and then filtered. $Na_2SO_3$ is added into the filtrate for reduction until the content of Te in the solution is 0.03 g/l, which is filtered and washed to obtain a precipitate of tellurium as the precipitate and a bismuth-containing solution as the filtrate. Concentrated HCl is added into the tellurium precipitate in a liquid-solid ratio of 1:1 for washing so as to dissolve other impurities, which is filtered and then washed with pure water until pH reaches 3.5, and the Te precipitate is then baked to yield fine Te powder with purity of 99.9952%. The resultant waste solution is to be used as leach solution for Te extraction in the next production. The examination results of the product are shown in the following table:

| | Name | | | | | | | |
|---|---|---|---|---|---|---|---|---|
| | Mg | Pb | Se | Ni | Ag | Sb | Bi | Cu | Mn |
| ppm | 0.3 | 0.78 | 0.5 | 0.72 | 0.65 | 0.11 | 10 | 10 | 0.2 |
| | Name | | | | | | | |
| | Co | Zn | Ca | Fe | As | Al | Sn | S | Na |
| ppm | 0.1 | 0.3 | 0.24 | 10 | 0.1 | 0.42 | 0.21 | 0.5 | 0.8 |

$Bi_2O_3$ purification: the above bismuth-containing filtrate is adjusted with the basic filtrate produced in $Bi_2O_3$ purification in Example 3 and NaOH to pH 3.1, filtered and washed. The resulting precipitate is a mixture of BiO(OH), $Bi(OH)_3$ and BiOCl, and a resulting filtrate can be used as leach solution for tellurium extraction in the next production. The precipitate mixture is transferred into a blender, and blended with pure water added at a liquid-solid ratio of 1:1, and then adjusted with NaOH to pH 8-9, stirred under heating for 2.5 h, with the temperature raised to 90° C., to produce yellow $Bi_2O_3$, which is filtered and washed to obtain a $Bi_2O_3$ precipitate and a basic filtrate; the precipitate is baked to prepare a 99.992% $Bi_2O_3$ product, and the basic filtrate can be maintained for use for pH adjustment in the next $Bi_2O_3$ extraction.

EXAMPLE 5

12 tons of the raw materials were crushed to 120 meshes, and the content of each element in the raw material is shown in the table below:

| | Name | | | | | | | | | | | |
|---|---|---|---|---|---|---|---|---|---|---|---|---|
| | Te | Bi | Cu | Fe | Pb | Ca | S | Al | $SiO_2$ | Co | Ni | Se |
| content % | 1.98 | 2.63 | 2.05 | 20.5 | 0.013 | 3.01 | 5.03 | 15.2 | 6.0 | 0.008 | 0.01 | 0.02 |

Leaching is carried out in three portions with 4 tons each portion, with a liquid-solid ratio of 1.5, using the waste solution produced in Example 4. Leaching data is shown in the table below:

| Name | Amount of liquid added | Leach time | Adding conc. $H_2SO_4$ | | | Adding $NaClO_3$ | | | Residual acidity | Te leach rate | Bi leach rate |
|---|---|---|---|---|---|---|---|---|---|---|---|
| | | | Amount added | Leach time | Leach temp. | Amount added | Leach time | Leach temp. | | | |
| 1st portion | 6 m³ waste solution | 2 h | 2T | 2.5 h | 54° C. | 100 kg | 2.5 h | 86° C. | 0.5N | 99.5% | 99.62% |
| 2nd portion | 6 m³ waste solution | 2 h | 2.14T | 2 h | 53° C. | 100 kg | 2.5 h | 85.5° C. | 0.5N | 99.56% | 99.65% |
| 3rd portion | 6 m³ waste solution | 2 h | 2.13T | 2 h | 54° C. | 100 kg | 2 h | 89° C. | 0.6N | 99.61% | 99.73% |

Detailed description for procedures which are the same as Example 4 is omitted, with the exception that all leaching is carried out using waste solution with no $NH_4Br$ added. Full analysis data of the leach solution and leach residue are shown in the table below:

| | | Name | | | | | | | | | | | |
|---|---|---|---|---|---|---|---|---|---|---|---|---|---|
| | | Te | Bi | Cu | Fe | Pb | Ca | Mg | Al | $SiO_2$ | Co | Ni | Se |
| 1st portion | Leach solution g/l | 12.1 | 18.1 | 9.8 | 18.7 | 0.008 | 0.21 | 4.5 | 17.1 | 0.83 | 0.035 | 0.041 | 0.022 |
| | Leach residue % | 0.017 | 0.018 | 0.11 | 18.3 | 0.005 | 2.9 | 2.8 | 13.3 | 2.85 | 0.006 | 0.0008 | 0.018 |
| 2nd portion | Leach solution g/l | 12.8 | 17.8 | 10.1 | 19.3 | 0.009 | 0.18 | 4.2 | 18.1 | 0.78 | 0.037 | 0.039 | 0.021 |
| | Leach residue % | 0.015 | 0.017 | 0.09 | 19.1 | 0.003 | 2.8 | 2.7 | 13.8 | 2.78 | 0.0005 | 0.0006 | 0.017 |
| 3rd portion | Leach solution g/l | 12.5 | 17.5 | 10.5 | 19.5 | 0.007 | 0.17 | 4.1 | 17.5 | 0.85 | 0.041 | 0.038 | 0.025 |
| | Leach residue % | 0.016 | 0.018 | 0.1 | 19.0 | 0.006 | 2.75 | 2.9 | 13.6 | 2.91 | 0.0007 | 0.0007 | 0.015 |

The three portions of leach solution is adjusted with NaOH to pH 2.7, 2.9 and 3.1 respectively, the resulting Te—Bi precipitates are combined and dissolved by concentrated HCl added, and then filtered. $Na_2SO_3$ is added into the filtrate for reduction until the content of Te in the solution is 0.014 g/l, which is filtered and washed to obtain a precipitate of tellurium as the precipitate and a bismuth-containing solution as the filtrate. Concentrated HCl is added into the tellurium precipitate thus obtained in a liquid-solid ratio of 1:1 for washing so as to dissolve other impurities, which is filtered and washed with pure water until pH reaches 4.2, and the precipitate is then baked to yield fine Te powder with purity of 99.9955%. The resultant waste solution is to be used as leach solution for tellurium extraction in the next production.

The examination results of the product are shown in the following table:

| | Name | | | | | | | | |
|---|---|---|---|---|---|---|---|---|---|
| | Mg | Pb | Se | Ni | Ag | Sb | Bi | Cu | Mn |
| ppm | 0.25 | 0.13 | 0.3 | 0.2 | 0.35 | 0.31 | 8 | 8.5 | 0.3 |

| | Name | | | | | | | | |
|---|---|---|---|---|---|---|---|---|---|
| | Co | Zn | Ca | Fe | As | Al | Sn | S | Na |
| ppm | 0.25 | 0.15 | 0.34 | 9.3 | 0.2 | 0.52 | 0.13 | 0.6 | 0.54 |

$Bi_2O_3$ purification: the above bismuth-containing filtrate is adjusted with the basic filtrate produced in $Bi_2O_3$ purification in Example 4 and $NH_3$ to pH 2.9, filtered and washed. A resulting precipitate is a mixture of $BiO(OH)$, $Bi(OH)_3$ and $BiOCl$, and a resulting filtrate can be used as leach solution for tellurium extraction in the next production. The precipitate is transferred into a blender, and blended with pure water added at a liquid-solid ratio of 1:1, and then adjusted with $NH_3$ to pH 8-9, stirred under heating for 3 h, with the temperature raised to 88° C., to produce yellow $Bi_2O_3$, which is filtered and washed to obtain a $Bi_2O_3$ precipitate and a basic filtrate; the precipitate is baked to prepare a 99.99% $Bi_2O_3$ product, and the basic filtrate can be maintained for use for pH adjustment in the next $Bi_2O_3$ extraction.

Byproducts recovery: the following byproducts are extracted from waste water:

| Name | Amount of byproduct |
|---|---|
| $Na_2SO_4 \cdot 10H_2O$ | 11.25T |
| Spongy copper | 45 kg |
| $AgNO_3$ | 5.3 kg |

EXAMPLE 6

300 g of anode slime is used, and the content of individual components in the raw material is shown in the table below:

| | Name | | | | | | | | | |
|---|---|---|---|---|---|---|---|---|---|---|
| | Te | Au | Ag | Cu | Fe | Pb | Sb | Se | Ca | Mg | $H_2O$ |
| Content % | 6.23 | 0.093 | 1.96 | 20.3 | 3.15 | 6.12 | 2.51 | 1.3 | 0.13 | 2.5 | 35.1 |

The raw material is divided into three portions with 100 g each portion and leached, with a liquid-solid ratio of 2, using the waste water produced in Example 5. Leaching data is shown in the table below:

| Name | Amount of waste liquid added | Leach time | Adding conc. $H_2SO_4$ | | | Adding $NaClO_3$ | | | Residual acidity | Te leach rate |
|---|---|---|---|---|---|---|---|---|---|---|
| | | | Amount added | Leach time | Leach temp. | Amount added | Leach time | Leach temp. | | |
| 1st portion | 200 ml | 1.5 h | 60 g | 2 h | 51° C. | 3 g | 3 h | 83° C. | 1.0N | 99.9% |
| 2nd portion | 200 ml | 1.5 h | 60 g | 2 h | 51.5° C. | 3 g | 3 h | 83.5° C. | 1.1N | 99.93% |
| 3rd portion | 200 ml | 1.5 h | 60 g | 2 h | 52° C. | 3 g | 3 h | 84° C. | 1.1N | 99.95% |

Detailed description for procedures which are the same as the five preceding examples is omitted, with the exception that the anode slime from the smelting plant is used as the raw material. All leaching is carried out using waste solution with extremely high leach rate and little amount of residues, mostly being $PbSO_4$ and small amount of Ag, Cu, Sb compounds. Full analysis data of the leach solution and leach residue are shown in the table below:

|  |  | Name | | | | | | | | | |
|---|---|---|---|---|---|---|---|---|---|---|---|
|  |  | Te | Fe | Cu | Se | Pb | Sb | Ca | Mg | Au | Ag |
| 1st portion | Leach solution g/l | 20.01 | 10.1 | 64.9 | 4.2 | 0.31 | 5.8 | 0.11 | 8.01 | Trace | Trace |
|  | Leach residue % | 0.009 | 0.01 | 0.08 | 0.005 | 6.2 | 0.5 | 0.15 | 0.001 | 0.21 | 4.13 |
| 2nd portion | Leach solution g/l | 20.03 | 10.2 | 65.1 | 4.1 | 0.29 | 6.1 | 0.12 | 8.03 | Trace | Trace |
|  | Leach residue % | 0.008 | 0.013 | 0.07 | 0.003 | 6.3 | 0.8 | 0.13 | 0.003 | 0.23 | 4.25 |
| 3rd portion | Leach solution g/l | 20.02 | 10.3 | 64.8 | 4.3 | 0.32 | 6.2 | 0.11 | 8.02 | Trace | Trace |
|  | Leach residue % | 0.005 | 0.02 | 0.09 | 0.007 | 6.15 | 0.3 | 0.12 | 0.002 | 0.25 | 4.17 |

The three portions of leach solution are adjusted with NaOH to pH 2.7, 2.9 and 3.1 respectively, filtered and washed. The resulting Te precipitates are combined, dissolved by concentrated HCl, and then filtered. The filtrate is added with $Na_2SO_3$ for reduction until the content of Te in the solution is 0.01 g/l, filtered and washed to obtain a precipitate of tellurium.

The resulting tellurium precipitate is added with concentrated HCl at a liquid-solid ratio of 1:1 for washing so as to dissolve other impurities, filtered and washed with pure water until pH reaches 4. Cu, Se, Fe, Pb and Sb in the solution are separated with conventional methods to give corresponding byproducts, and the tellurium precipitate is baked to yield fine Te powder with purity of 99.9947%. The examination results of the products are shown in the following table:

|  | Name | | | | | | | | |
|---|---|---|---|---|---|---|---|---|---|
|  | Mg | Pb | Se | Ni | Ag | Sb | Bi | Cu | Mn |
| ppm | 0.31 | 0.25 | 1.1 | 0.1 | 0.58 | 0.63 | 0.2 | 6.3 | 0.15 |
|  | Name | | | | | | | | |
|  | Co | Zn | Ca | Fe | As | Al | Sn | S | Na |
| ppm | 0.13 | 0.15 | 0.15 | 1.2 | 0.51 | 0.21 | 0.09 | 0.3 | 0.58 |

This result demonstrates that, when the qualified leaching solution is adjusted with NaOH to pH 2.7 to 3.1, Te exists in the precipitate, while Se in solution, so that the object of separating Te from Se effectively can be achieved.

What is claimed is:

1. A hydrometallurgical method for extracting tellurium, comprising the steps of material selecting, leaching the selected material, and reducing and purifying a leach solution, which is characterized in that:
   the material selecting step includes selecting raw material with a tellurium content >1.8%; and
   the leaching step includes:
      placing the raw material in a leaching trough in which successively:
      (1) a solution and/or solid containing $Cl^-$, $Br^-$ and $NH_4^+$ is added at a ratio of $Cl^-$ >115 kg, $Br^-$ >16 kg and $NH_4^+$ >62 kg per ton of the raw material, with the liquid-solid ratio between the liquid and raw material in the leaching trough >1.5, and leaching at ambient temperature for 1 to 3 hours,
      (2) then adding concentrated $H_2SO_4$ in an amount of 500 to 1000 kg per ton of raw material and leaching for 1 to 3 hours with leaching temperature being 45-65° C., and the residual acidity being 0.5 to 1.5 N,
      (3) further adding $NaClO_3$ in an amount of 25 to 50 kg of $NaClO_3$ per ton of raw material, leaching under stirring for 2 hours or more with the leaching temperature being 75-95° C.;
      filtering and washing, and then collecting the leach solution.

2. The hydrometallurgical method for extracting tellurium according to claim 1, characterized in that the leaching step is followed by an impurity separation step comprising a precipitation process, wherein said impurity separation step includes: adjusting the pH of the leach solution to 2.7 to 3.1 a base bases, filtering and washing to obtain waste solution A and a precipitate, dissolving the precipitate with concentrated hydrochloric acid, filtering and then collecting filtrate which enters a reduction and purification step.

3. The hydrometallurgical method for extracting tellurium according to claim 2, characterized in that:
   the reduction step includes introducing sulfite or $SO_2$ gas into the filtrate for reduction until Te <0.03 g/l, filtering and washing to obtain a tellurium-containing precipitate and filtrate B;
   the purification step includes adding concentrated HCl in a liquid-solid ratio >1:1 into the above tellurium-containing precipitate for washing, filtering to obtain a tellurium precipitate and waste solution C, washing the tellurium precipitate with pure water until pH >3, filtering to obtain the tellurium precipitate and waste solution D, and baking the tellurium precipitate.

4. The hydrometallurgical method for extracting tellurium according to claim 3, characterized in that the sulfite is $Na_2SO_3$.

5. The hydrometallurgical method for extracting tellurium according to claim 3, wherein the method further includes returning the filtrate B from the reduction step back into part (1) of the leaching step for leaching or for extracting $Bi_2O_3$.

6. The hydrometallurgical method for according to claim 3, which further includes: adjusting the pH of the filtrate B with bases to 2.7-3.1, filtering and washing to obtain a bismuth-containing precipitate and waste solution E, transferring the bismuth-containing precipitate into an agitator with a pure water:solid ratio >1:1 and adding bases under stifling to adjust to pH 8-9, heating to 80-90° C., *filtering* and washing to obtain waste solution F and a $Bi_2O_3$ precipitate which is then baked.

7. The hydrometallurgical method for according to claim 6, characterized in that the pH of the filtrate B is adjusted with bases to 2.9.

8. The hydrometallurgical method for according to claim 6, characterized in that the base is NaOH and/or $NH_3$.

9. The hydrometallurgical method for according to claim 6, which further includes returning the waste solution E back into the step (1) of the leaching step for leaching.

10. The hydrometallurgical method for according to claim 6, which further includes using the waste solution F for pH adjustment.

11. The hydrometallurgical method for extracting tellurium according to claim 3, wherein the method further includes returning the waste solution C and/or waste solution D produced during the production processes back into part (1) of the leaching step for leaching.

12. The hydrometallurgical method for extracting tellurium according to claim 3, wherein the method further includes returning and recycling the waste solution produced during the process for leaching so as to continuously increase the concentration of metals with trivial amount in the leach solution, and recovering when the concentration reaches the recovery condition.

13. The hydrometallurgical method for extracting tellurium according to claim 2, characterized in that pH is adjusted to 2.9 by the base.

14. The hydrometallurgical method for extracting tellurium according to claim 2, characterized in that the base is NaOH and/or $NH_3$.

15. The hydrometallurgical method for extracting tellurium according to claim 2, wherein the method further includes returning the waste solution A produced during the production processes back into part (1) of the leaching step for leaching.

16. The hydrometallurgical method for extracting tellurium according to claim 2, wherein the method further includes returning and recycling the waste solution produced during the process for leaching so as to continuously increase the concentration of metals with trivial amount in the leach solution, and recovering when the concentration reaches the recovery condition.

17. The hydrometallurgical method for extracting tellurium according to claim 1, characterized in that the solution and/or solid containing $Cl^-$, $Br^-$ and $NH_4^+$ is a solution and/or solid of $NH_4Br$ and $NH_4Cl$.

18. The hydrometallurgical method for extracting tellurium according to claim 1, characterized in that the raw material is fine mineral powders of 80 meshes and above.

* * * * *